United States Patent [19]
Pulizzi et al.

[11] Patent Number: 4,918,562
[45] Date of Patent: Apr. 17, 1990

[54] POWER CONTROLLER WITH VOLTAGE-CONTROLLED CIRCUIT BREAKER

[75] Inventors: Peter S. Pulizzi, Fountain Valley; John D. Pequet, Laguna Nigel; Roger W. Cook, Garden Grove; Stephen J. Kane, Placentia, all of Calif.

[73] Assignee: Pulizzi Engineering, Inc., Santa Ana, Calif.

[21] Appl. No.: 303,912

[22] Filed: Jan. 30, 1989

[51] Int. Cl.[4] .............................................. H02H 3/24
[52] U.S. Cl. ........................................ 361/86; 361/90; 361/114; 340/663
[58] Field of Search ..................................... 361/90–92, 361/89, 102, 103, 106, 111, 187, 114, 86; 340/663, 662

[56] References Cited
U.S. PATENT DOCUMENTS

| | | |
|---|---|---|
| 3,590,325 | 6/1971 | McMillen et al. ..................... 361/92 |
| 3,644,790 | 2/1972 | Kozlovic et al. ..................... 361/114 |
| 3,740,738 | 6/1973 | Kosanovich et al. ................. 361/92 |
| 3,813,579 | 5/1974 | Doyle et al. ......................... 361/102 |
| 4,331,996 | 5/1982 | Matsko et al. ....................... 361/92 |
| 4,584,623 | 4/1986 | Bello et al. ........................... 361/90 |

Primary Examiner—Todd E. DeBoer
Attorney, Agent, or Firm—Howard R. Lambert

[57] ABSTRACT

A power controller comprises a manually-on circuit breaker having an electrically-actuatable trip coil which enables the circuit breaker to be tripped-off electrically. The circuit breaker is connected to a voltage source and provides operating voltage to a power outlet. A line voltage monitor provides a voltage indication to a logic control circuit when operating voltage moves outside a predetermined range established by setting upper and lower operating voltage limits. In response to receiving such a voltage indication, the logic control circuit deenergizes a relay, thereby connecting a charged capacitor to the tripping coil of the circuit breaker to cause the breaker to be tripped-off even when the voltage to the circuit breaker drops to zero volts. Other signals provided to the control logic circuit also cause the deenergizing of the relay controlling the circuit breaker tripping capacitor. A logic control timing circuit enables the circuit breaker to latch on when it is manually turned on and while the operating voltage is stabilizing in the line voltage monitor. The power controller apparatus may include at least one switched power outlet connected for receiving operating voltage from the circuit breaker and includes a switch for enabling the switched power outlet to be selectively turned on and off while the circuit breaker is tripped on.

18 Claims, 5 Drawing Sheets

POWER CONTROLLER WITH VOLTAGE-CONTROLLED CIRCUIT BREAKER

BACKGROUND OF THE INVENTION

1. Field of the Invention

The present invention relates generaly to the field of electric power controller apparatus and, more particularly, to such apparatus having a manually-on and a manually- and electrically-off circuit breaker which controls one or more power outlets.

2. Discussion of the Prior Art

Many different electrical (or electronic) systems are known which are comprised of a number of different pieces of separately-powered electrical equipment. As an example, a computer system may comprise a main frame computer, several disc drives, and one or more work stations. As another example, a typical sensor system may comprise a number of separately-powered sensors, a well as a monitor or controller.

In some instances, all the different pieces of electrical equipment comprising a particulr system may be separately plugged into building power outlets. On the other hand, it is often preferred that all, or at least some, of the different pieces of electrical equipment comprising a particular system receive power from a common piece of electrical equipment commonly called a power controller. By means of such a power controller, the pieces of electrical equipment powered thereby may be turned on all at once or in some preestablished manner. For example, U.S. Pat. No. 4,719,364 to Pequet, et al., discloses an electrical power controller apparatus which provides a plurality of time-delayed power outlets which enable a like plurality of different pieces of electrical equipment to be powered-up (that is, turned on) in a predetermined time sequence with time delays possible between each turn-on. In turn, U.S. Pat. No. 4,769,555, also to Pequet, et al., discloses a power controller apparatus which provides both time-delayed powering-up and powering-down of electrical or electronic equipment which is connected to the apparatus.

In some electrical systems, it is desirable to have a power controller which shuts off all of the pieces of electrical equipment powered thereby in the event an emergency, an out-of-control, or some other preestablished condition occurs. As an illustration, it may be desirable for the power controller to turn off the equipment powered thereby if the line voltage supplied through the controller increases or decreases beyond preestablished limits in order to reduce the risk of electrical damage to the controlled equipment. In this regard, it is, for example, often the case that computer disc drives can be damaged if the driving voltage decreases significantly below its normal 110 or 220 volt level.

However, it may, at the same time, be undesirable to automatically power-up the controlled equipment when the emergency or out-of-control situation ceases or is cured. Instead, it may be preferred, once an emergency or out-of-control situation has caused the electrical equipment connected to the power controller to be shut down, to check out the system before the equipment is powered back up. In order to accomodate such a mode of operation, it is advantageous if the power controller is configured for automatic, electrical turn-off but for manual-only turn-on. Normally, it is usually desirable that the power controller also have the capability for manual turn-off so that the equipment connected to the controller can be powered down at will by an operator.

It is, however, difficult to provide economical power controllers which can be automatically turned off by electrical power when the situation necessitating the turn-off is failure of line power to the controller.

A principal objective of the present invention is, therefore, to provide a relatively inexpensive power controller which provides for automatic, electrical turn-off even when line power to the power controller is disrupted.

SUMMARY OF THE INVENTION

In accordance with the present ivention there is provided a power controller apparatus which comprises a circuit breaker having an electrically-actuatable trip coil for enabling the circuit breaker to be tripped-off electrically and means for electrically connecting the circuit breaker to a source of operating voltage. Additionally comprising the power controller apparatus are at least one unswitched power outlet connected to the circuit breaker to receive operating voltage therefrom; means for monitoring the operating voltage from the voltage source and for providing a voltage indication when the operating voltage moves outside of a preestablished range; and logic control means for receiving such voltage indication and for tripping-off the circuit breaker in response thereto. Included in the logic control means are a capacitor, means for charging the capacitor when the circuit breaker is tripped on, and relay means for connecting the capacitor to the circuit breaker trip coil for causing the energizing thereof in response to the receiving of the voltage indication. Preferably the operating voltage monitoring means include means enabling the setting of an upper line voltage limit and the separate setting of a lower line voltage limit, the upper and lower line voltage limits establishing the voltage range.

It is preferred that the circuit breaker include manual switching means enabling the circuit breaker to be manually tripped-on and tripped-off and that the circuit breaker is configured so that after being tripped-off by the energizing of the trip coil, the circuit breaker remains off until it is manually tripped on. Further, it is preferred that the logic control means include delay means for enabling the circuit breaker to stay manually tripped on while the line voltage is being established in the line monitoring means so that an initial indication of low voltage does not automatically trip off the circuit breaker.

According to an embodiment of the invention, the power controller apparatus includes at least one switched power outlet connected for receiving operatingvoltage from the circuit breaker and including a switch for enabling the switched power outlet to be selectively turned on and off while the circuit breaker is tripped on. Moreover, the power controller apparatus may include thermal protection means for providing a second voltage indication when the temperature in a monitored region of the apparatus exceeds a preestablished temperature, the logic control means being connected for receiving such second voltage indication and being operative for connecting the above-mentioned capacitor to the circuit breaker trip coil in response to the second voltage indication being received by the logic control means.

The power controller apparatus may advantageously include means enabling the connection of an external bus thereto, in which case the logic control means is connected for receiving a third voltage indication from the external bus and is operative for connecting the above-mentioned capacitor to the circuit breaker trip coil in response to the third voltage indication being received by the logic control means.

BRIEF DESCRIPTION OF THE DRAWINGS

The present invention can be more readily understood by a consideration of the following detailed description when taken in conjunction with the accompanying drawings, in which.

In the various FIGS. like elements and features are given the same reference number and/or other identification.

DESCRIPTION OF THE PREFERRED EMBODIMENT

Figure 1:
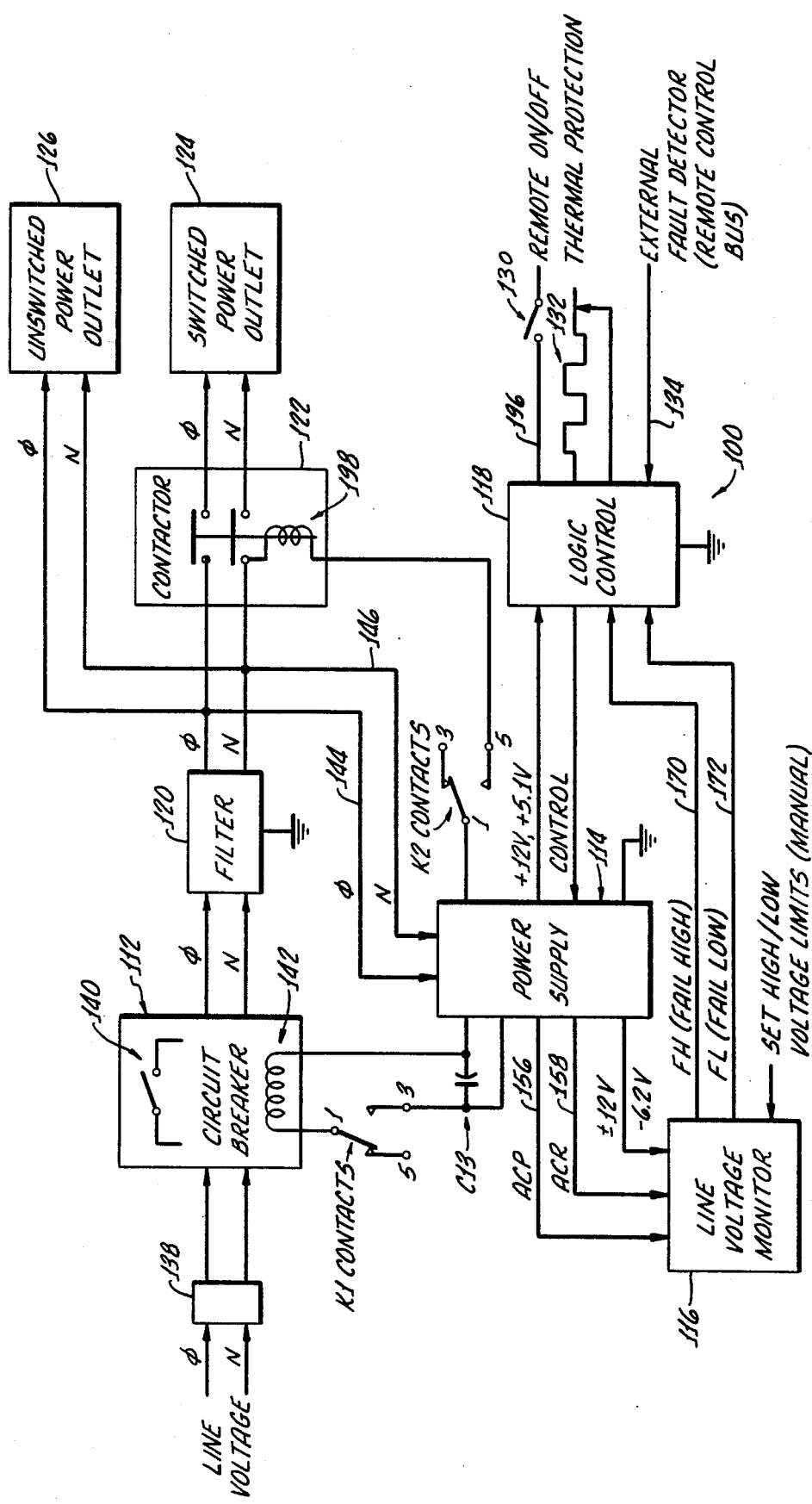
FIG. 1 is a schematic block diagram of an exemplary power controller apparatus having a circuit breaker which, in accordance with the present ivention, is capable of manual-only turn-on and of automatic, electrical turn-off when the line voltage to which the circuit breaker is connected is out of a preestablished range, and even in the event of line voltage interruption.

There is depicted in FIG. 1, in conventional electrical block diagram form, an exemplary power controller 100 in which the present invention relating to a voltage-controlled circuit breaker 112 (described hereinbelow) can be used to advantage. It will, however, be appreciated from the following description that the present invention is not limited to use in a power controller, such as power controller 100. In this regard, power controller 100 is merely used to illustrate one manner in which the present invention can be used and to serve as a vehicle whereby the invention can be clearly described.

As is more particularly described below, power controller 100 further comprises a power supply 114, a line voltage monitor 116, a logic control 118, an electric filter 120, a contactor (power relay) 122, a switched power outlet 124, and an unswitched power outlet 126. Shown electrically connected to logic control 118 are a remote ON/OFF switch 130, a thermal protector 132, and an external fault detector 134, the latter of which may also be considered as a remote control bus.

Circuit breaker 112, which is preferably a manual turn-on and manual and electrical turn-off type, is shown in FIG. 1 as being connected at an input side, for example, by a conventional plug 138 to a source of operating voltage, such as a building electrical outlet (not shown) which is considered to be 110 volts for power controller 100 as depicted and described herein. It is to be appreciated, however, that comparable power controller apparatus may be constructed for different line voltages (such as 220 volts) in a manner which will, from the following description, be apparent to those skilled in the electrical and electronic circuit design arts. In addition to being configured for electrical tripping-off, as described below, circuit breaker 112 has a manually-operated ON/OFF switch or tripper 140.

The output voltage of circuit breaker 112 is provided, through filter 120, directly to unswitched power outlet 126, which may include a plurality of conventional electrical outlet receptacles (not shown). Although the inclusion of filter 120 is generally preferred for enabling the filtering out of operating voltage spikes and noise in a conventional, known manner, the filter is not essential to operation of power controller apparatus 100.

As further shown in FIG. 1, the voltage output of circuit breaker 112 is also provided, through contactor 122 to switched power outlet 124, which may also comprise a plurality of conventional electrical outlet receptacles. Contactor 122 is controlled, through logic control 118, by remote ON/OFF switch 130, so that switched outlets 124 can be deenergized without having to trip circuit breaker 112, through which the operating (line) voltage is provided to both switched and unswitched power outlets 124 and 126, respectively. However, it is to be appreciated that the providing of contactor 122, switched power outlet 124 and remote ON/OFF switch 130 (and the associated circuitry described below) is not essential to power controller 100, but may be desirable for particular customer applications. As such, contactor 122, switched power outlet 124, remote switch 130, and related circuitry does not affect the automatic tripping operation of circuit breaker 112, which is more particularly described below.

Advantageously, the automatic tripping of circuit breaker 112 is responsive to the operating line voltage being outside a preselected range; that is, when the line voltage either increases above a preselected (preset) upper limit or decreases below a preselected (preset) lower limit. It may, for example (without any limitation being thereby intended or implied), be desirable for a line voltage of 110 volts and for some applications to preset the upper limit at about 132 volts and the lower limit at about 90 volts. Also as more particularly described below, it is the function of line voltage monitor 116 to monitor a line voltage signal provided to it by power supply 114 and to provide a change of voltage state on FAIL HI or FAIL LO output lines connected to logic control 118 when the line voltage rises above the preset upper limit or falls below the preset lower limit. Responsive to such a voltage state change on either FAIL HI or FAIL LO lines, logic control 118 is configured for causing (through power supply 114) the electrical tripping-off of circuit breaker 112, thereby causing the deenergizing of both switched power outlet 124 (assuming such outlet is provided and has been energized by operation of remote ON/OFF switch 130) and unswitched power outlet 126. Of course, such tripping-off of circuit breaker 112 deenergizes entire power controller 100.

It is also preferred, in many customer applications, that logic control 118 be operative for causing the automatic electrical tripping-off of circuit breaker 112 whenever thermal protector 132 indicates an excessively high temperature (that is, exceeds a predetermined temperature limit) and/or when a signal on remote control bus indicates some sort of defined fault. In the particular embodiment of power controller 100 illustrated and described herein, both thermal protector 132 and remote control bus 134 must be in their "normal" state and the line voltage must be within the preset upper and lower limits before circuit breaker 112 will stay latch when it is manually tripped on. If any of the mentioned inputs (that is, thermal protector 132, remote control bus 134, FAIL HI and FAIL LO) are in a non-normal condition indicative of a problem of some sort, circuit breaker 112 will not stay latched on.

In any event, circuit breaker 112 is configured so that once tripped-off by operation of logic control 118, the circuit breaker must be manually switched back on before power control apparatus 100 is again operable. An important advantage associated with this type of circuit breaker configuration and operation is that after a condition arises which causes the automatic tripping-off of circuit breaker 112, an operator has the opportunity to inspect the system and, if desired, unplug any particularly sensitive electrical equipment from outlets 124 and/or 126 before the the circuit breaker is tripped back on, in case there may be some problem with power controller 100 itself.

It can, perhaps, be appreciated that it is difficult to provide automatic electrical tripping-off of circuit breaker 112 in a situation in which all electrical line power is interrupted—that is, when the operating line voltage drops to zero. In the present invention, again as more particularly described below, the electrical tripping-off of circuit breaker 112 is accomplished by the connecting of a charged electrical capacitor, designated in a conventional manner in FIGS. 1, 2, and 5 as "C13", across a tripping coil 142 of circuit breaker 112. As described below, capacitor C13 is connected in a manner causing it to become charged to line voltage during normal operation of power controller 100.

Figure 2:
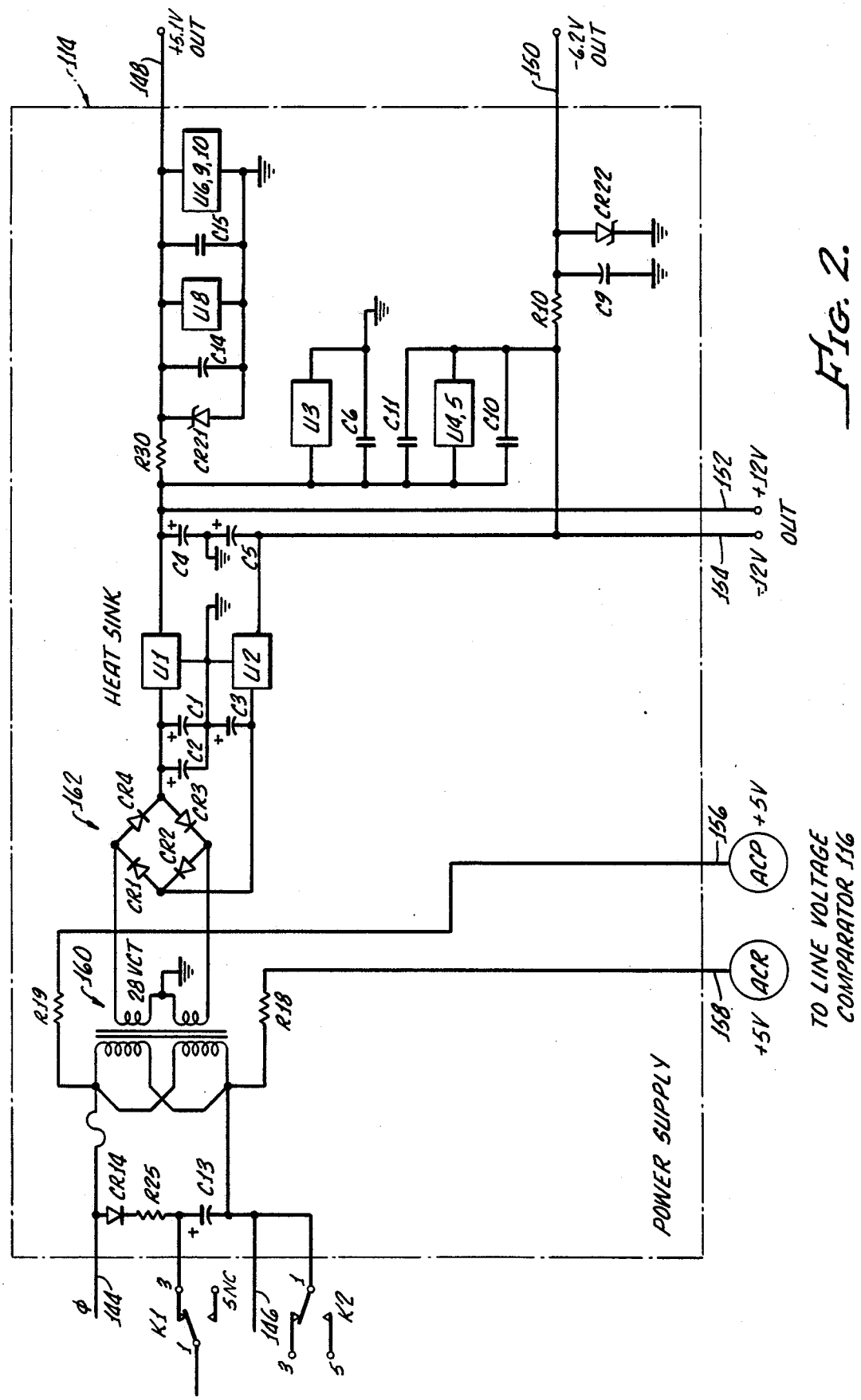
FIG. 2 is an electrical schematic drawing showing an exemplary electronic implementation of a power supply portion of the power controller apparatus of FIG. 1.

FIG. 2 depicts, in electrical schematic drawing form, a presently preferred manner in which power supply 114 can be electronically implemented. As shown, power supply 114 is configured to operate on 110 volts AC input, received over conduits 144 and 146 from the voltage output side of filter 120 (FIG. 1), and to provide a nominal +5.1 volts DC output on conduit 148, a nominal −6.2 volts DC output on conduit 150, a nominal +12 volts DC output on conduit 152, and a nominal −12 volts DC output on conduit 154. In addition, power supply 112 is configured for providing nominal +5 volts AC signals, identified, respectively, as ACP (AC power) and ACR (AC return), on respective output conduits 156 and 158.

Comprising power supply 114 are a transformer 160 which provides a 28 volt AC output and a full wave rectifier 162 which provides +/−12 volt DC outputs for conduits 152 and 154. Connected across voltage input conduits 144 and 146 are a diode (designated on FIG. 2 as "CR14"), a resistor (designated as "R25") and capacitor C13. Connected between resistor R25 and capacitor C13 are contacts of relay K1 which control the discharge of capacitor C13 into circuit breaker tripping coil 142. Connected to the other side of capacitor C13 are the contacts of relay K2 which energize contactor 122. (FIG. 1).

Other interconnected electronic components (conventional resistors, capacitors, diodes, regulators and comparators) of power supply 114 are designated in FIG. 2 in a conventional manner known to those skilled in the electronics art, it being, therefore, considered unnecessary to specifically describe all such components and the manner in which they are interconnected to provide the above-listed voltage outputs. Values of these other electronic components of power supply 114, as well as their designation or part numbers, are as shown in Table A and/or Table B below.

As mentioned above, the function of line voltage monitor 116 is to monitor the operating voltage provided to power controller apparatus 100 and to provide an output signal change of state on FH (fail high) output conduit 170 or on FL (fail low) output conduit 172 in response to the line voltage either increasing above the preset upper voltage limit or falling below the preset lower voltage limit. Change of state signals on conduits 170 and 172 are provided to logic control 118, which acts on the change of state of either of the FH and FL signals to cause the electrical tripping of circuit breaker 112 by voltage applied to trip coil 142 by capacitor C13.

Although line voltage monitor 116 can be electronically implemented in a number of different ways, a circuit which the present inventors have found practical and economical is depicted in electronic schematic form in FIG. 3, on which the various electronic components are identified in a conventional manner known to those skilled in the electronics art, and which are identified, with appropriate values given, in Table A and/or Table B below. Of particular note, however, are variable resistors, identified as "R3" and "R7", by means of which the upper voltage limit and lower voltage limit are manually "set" by appropriate variation (adjustment) of such resistors. These resistors R3 and R7 may, for example, be set for upper and lower operating voltage limits by varying the line voltage up and down by any known means and adjusting the resistors until circuit breaker 112 is tripped-off at the desired upper and lower voltage levels.

Figure 3:
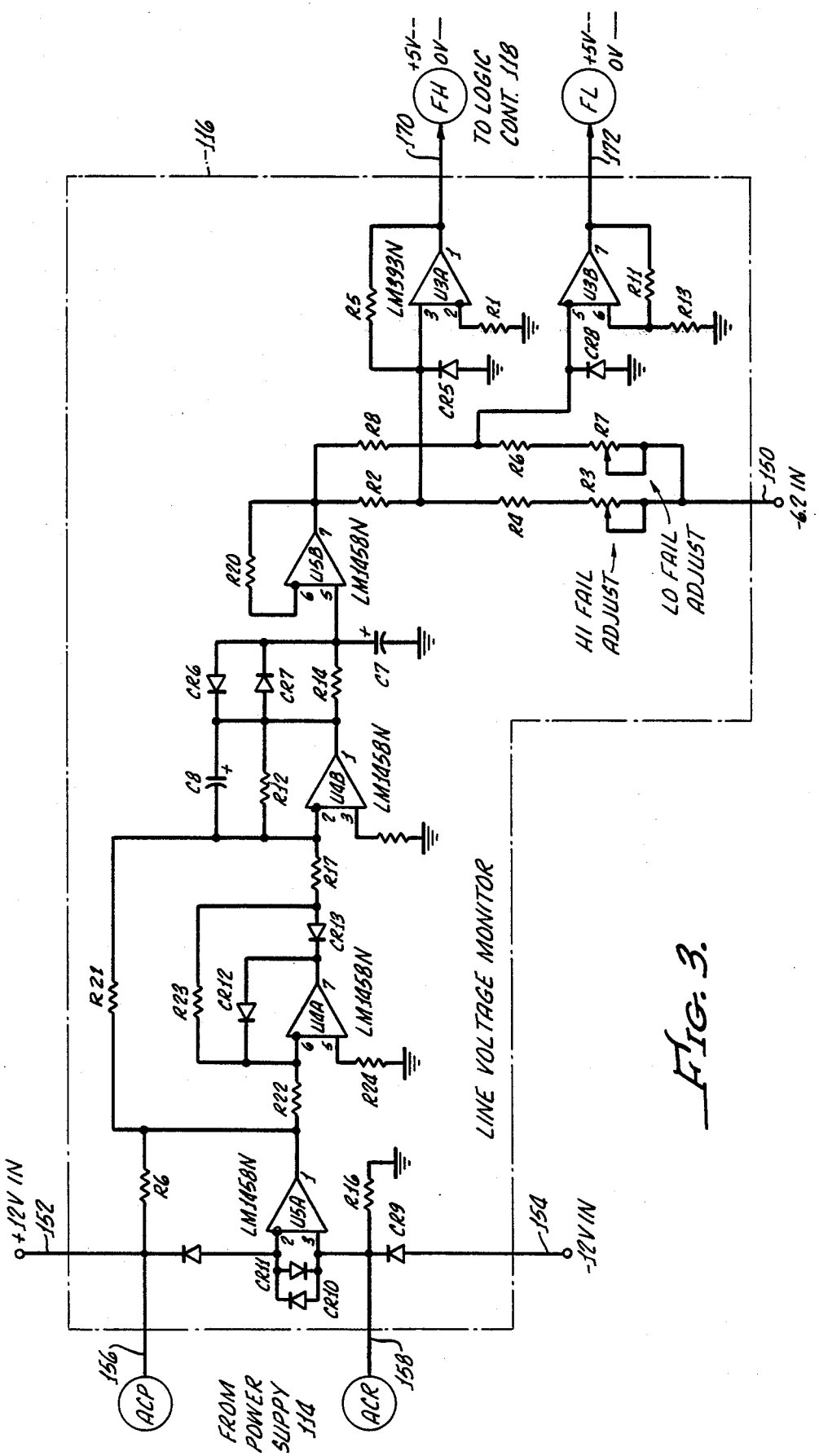
FIG. 3 is an electrical schematic drawing showing an exemplary electronic implementation of a line voltage monitor (voltage comparator) portion of the power controller apparatus of FIG. 1.

In the particular line voltage moitoring circuit depicted schematically in FIG. 3, the output voltage on FH and FL output conduits 170 and 172 are maintained at ground when the line voltage (as represented by inputs provided to line voltage monitor 116 over ACP and ACR conduits 156 and 158, respectively) is within the preselected upper and lower voltage limits. However, when the line voltage increases to greater than the preselected upper limit or decreases to below the preselected lower limit, the voltage on respective conduits 170 (FH) and 172 (FL) changes abruptly to about +5 volts DC. From power supply 114, line voltage monitor 116 is provided +12 volts DC over conduit 152, −12 volts DC over conduit 154, and −6.2 volts DC over conduit 150.

Inasmuch as the configuration of line voltage monitor 116 is set forth in detail in FIG. 3 (in conventional electronic notation), it is considered unnecessary to further describe the circuit herein. Such circuitry is, however, depicted in simplified, logic form in FIG. 5, which depicts the ACP and ACR imputs (on respective conduits 156 and 158) being fed to the input of a differential amplifier 180, the output of which is, in turn, fed to a driver 182. The output of driver 182 is, in turn, fed to the input of each of voltage comparators 184 and 186 which also respectively receive the pututput from HI and LO resistors R3 and R7. The outputs of voltage comparators 184 and 186 provide the FH signal on conduit 170 and the FL signal on conduit 172.

Figure 4:
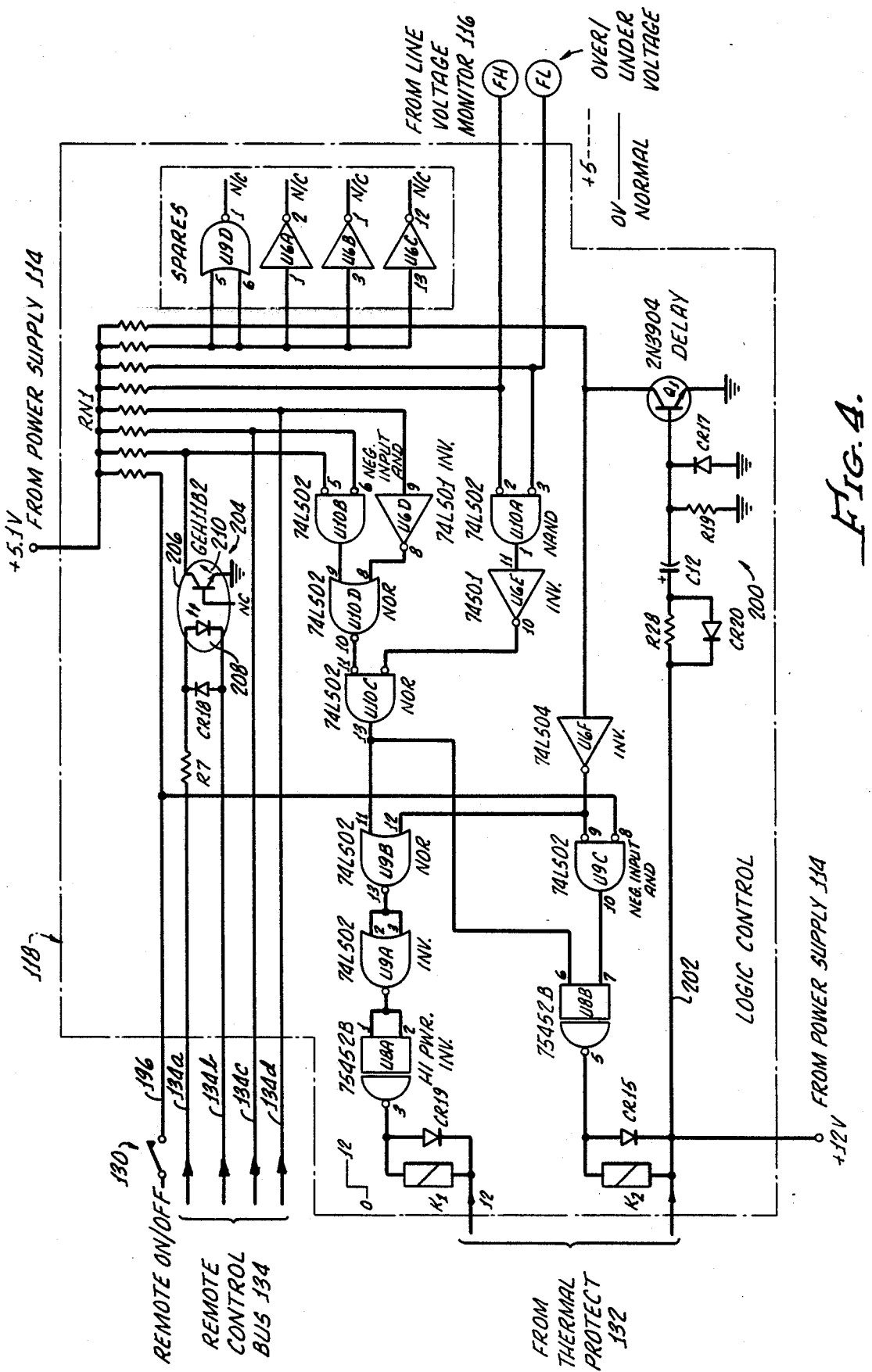
FIG. 4 is an electrical schematic drawing showing an exemplary electronic implementation of a logic control portion of the power controller apparatus of FIG. 1.
Figure 5:
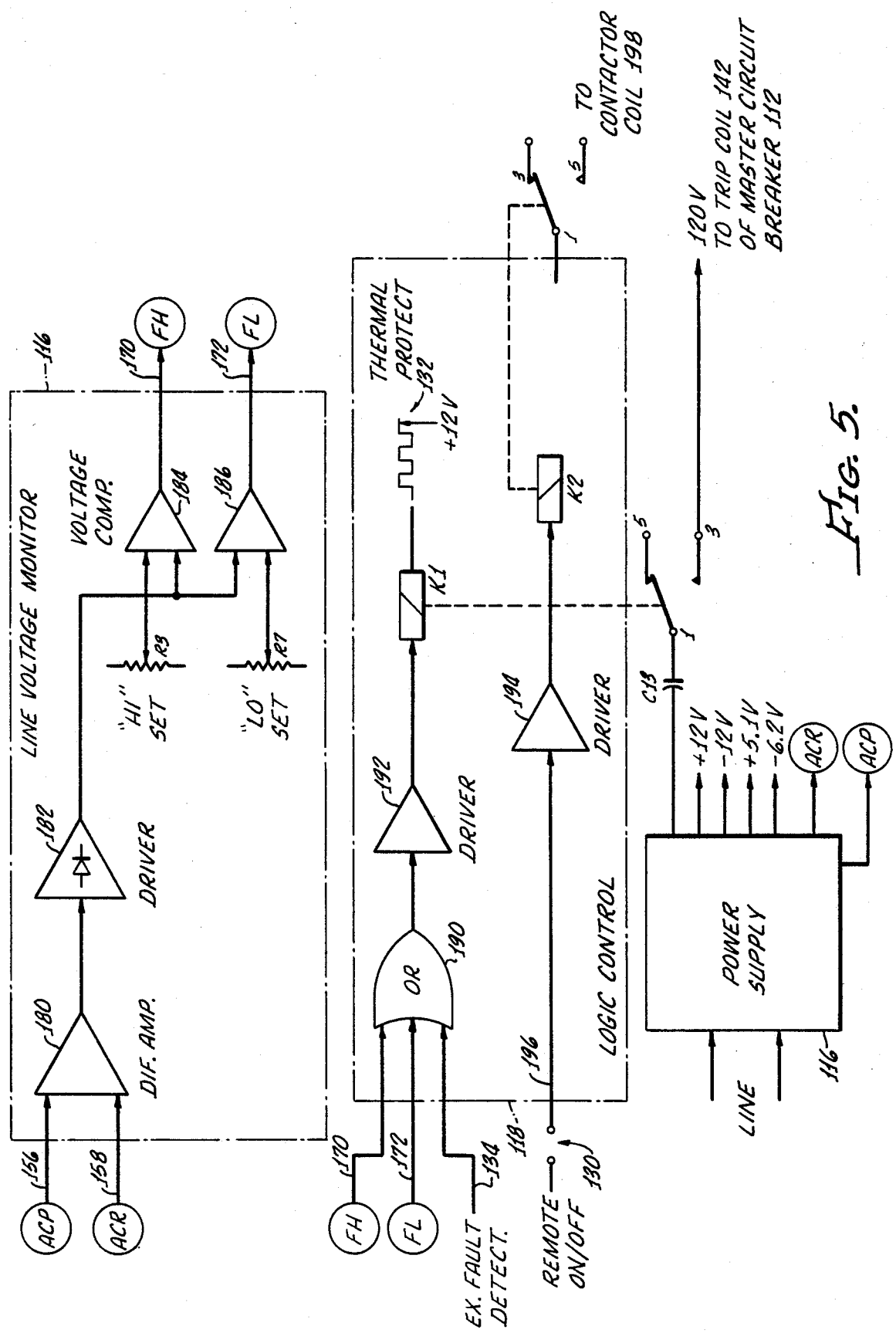
FIG. 5 is a simplified schematic drawing of the line voltage monitor the power supply and the logic control portions of the power controller of FIG. 1.

Logic control 118 is depicted in electric schematic form in FIG. 4 and in a more simplified, logic form in FIG. 5. Looking first at the simplified logic form of FIG. 5, it is seen that logic control 118 can be generally considered as comprising an OR gate 190, the output of which is connected, through a driver 192, to the energizing coil of relay K1. Fed (in parallel) into OR gate 190 are the FH signal on conduit 170, the FL signal on conduit 172, and the external fault signal on conduit 134.

Under normal operating conditions of power controller 100 (that is, when the operating line voltage is between the preestablished upper and lower limits and there are no faults on external bus 134), logic control operates so that the output of driver 192 applies 0 volts DC to energize the coil of relay K1, thereby opening the normally closed relay contacts and keeping capacitor C13 electrically isolated from tripping coil 142 of circuit breaker 112—thereby keeping the breaker from being tripped. However, in the event that any of the above-mentioned input signals to OR gate 190 changes state (due to the line voltage increasing or decreasing above or below the preestablished limits, as reflected by a change of voltage state on FL conduit 170 or FL conduit 172 or to a fault on external bus 134), the output of the OR gate output to driver 192 changes state, thereby causing the driver to deenergize the coil of relay K1. In consequence, the normally-closed contacts of relay K1 close, thereby electrically connecting capacitor C13 to tripping coil 142 of circuit breaker 112, the voltage from the capacitor energizing the trip coil and tripping circuit breaker 112 off.

It can also be seen from the simplified logic schematic of FIG. 5 that logic control 118 includes a driver 194 to the input of which is connected a conduit 196 in which remote ON/OFF switch 130 is installed. The output of driver 194 is connected to the coil of relay K2. When ON/OFF switch 130 is open, the coil of relay K2 is not energized and coil 198 of contactor 122 (FIG. 1) is not energized. Consequently, no voltage is applied from circuit breaker 112 to switched power outlet 124. When ON/OFF switch is closed, the K2 relay coil is energized, closing the contacts of the relay and thereby energizing contactor coil 198, in turn, applying operating line voltage, through contactor 122, to switched power output 124.

The above-described operations of logic control 118 (1) to automatically trip-off circuit breaker 112 to completely shut off power controller apparatus 100, and (ii) to enable the turning on and off of operating voltage to switched power outlet 124 without tripping off the circuit breaker can be electronically implemented in a number of different ways. However, the particular implementation shown in electronic schematic form in FIG. 4 has been found advantageous by the present inventors. Inasmuch as all electronic components used in constructing logic control 118 are shown and identified in FIG. 4 and/or Tables A and B, it is considered unnecessary to describe in further detail the configuration of the logic circuit other than as described below.

Beyond that which was described above for logic control 118 relative to FIG. 5, it is seen from FIG. 4, that there is advantageously provided a time delay circuit 200, which is connected, by an electric conduit 202, to one side of the K2 relay coil and which includes a grounded emitter, NPN transistor, identified as "Q1." It can be appreciated that immediately after circuit breaker 112 is tripped-on manually after having, for any reason been tripped-off, a low line voltage may be sensed by line voltage monitor 116, which then signals (over FL conduit 172) logic control 118 to automatically trip-off the circuit breaker. It is, therefore, the function of time delay circuit 200 to delay the deenergizing of K1 relay coil for a sufficient (short) time after circuit breaker 112 has been tripped-on to enable an accurate line voltage check to be made by line voltage monitor 116.

Also, remote control bus 134 may, as depicted in the electrical schematic of FIG. 4, consist of several external lines 134 a–d so as to provide to logic control 118 "fault" signals of more than one type and/or from more than one source. As shown for lines 134a and 134b, electrical isolation may be provided by an optically-coupling circuit 204 which includes a conventional solid state device 206 internally comprising a light emitting diode 208 and a phototransistor 210. Such optical coupling circuit 204 protects logic control from electrical overloads on lines 134a and 134b.

Since a number of the various, identified solid state gates used to implement logic control 118 (as shown in FIG. 4) are economically available in multiple-gate integrated circuits, some of the available gates are unused. The circuit schematic of FIG. 4 shows these unused gates as "spares" having unconnected outputs. Such spares are advantageously available for use in the event any of the gates already used malfunction or otherwise become unusable.

As mentioned above, all of the electronic components shown in the circuit schematic drawings of FIGS. 2, 3, and 4 are identified in the schematics and their descriptions—and part numbers, as appropriate—are listed in the following Tables A and B.

TABLE A

| PBC NO. | DESCRIPTION | PART NO. | QT. |
|---|---|---|---|
| R1, R15 | RESISTOR, 4.7 K, 5%, ¼ W | | 2 |
| R2 | RESISTOR, 9.5 K, 1%, ¼ W | | 1 |
| R3, R7 | POTENTIOMETER, 10 K, 20-TURNS | EVM-CEGA01B14 | 2 |
| R4, R6 | RESISTOR, 4.99 K, 1%, ¼ W | | 2 |
| R5 | RESISTOR, 1 M, 5%, ¼ W | | 1 |
| R8 | RESISTOR, 6.49 K, 1%, ¼ W | | 1 |
| R10 | RESISTOR, 560, 5%, ¼ W | | 1 |
| R11 | RESISTOR, 750 K, 5%, ¼ W | | 1 |
| R12 | RESISTOR, 15.4 K, 1%, ¼ W | | 1 |
| R13 | RESISTOR, 3.9 K, 5%, ¼ W | | 1 |
| R14, R16, R17, R26 | RESISTOR, 10 K, 1%, ¼ W | | 4 |
| R18, R19 | RESISTOR, 232 K, 1%, ¼ W | | 2 |
| R20, R24, R29 | RESISTOR, 10 K, 5%, ¼ W | | 3 |
| R21, R22, R23 | RESISTOR, 20 K, 1%, ¼ W | | 3 |
| R25 | RESISTOR, 1 K, 5%, 3 W, WIRE WOUND | | 1 |
| R27 | RESISTOR, 680, 5%, ¼ W | | 1 |
| R28 | RESISTOR, 6.8 K, 5%, ¼ W | | 1 |
| R30 | RESISTOR, 39, 5%, 2 W, WIRE WOUND | | 1 |
| C1, C2, C3 | CAPACITOR, 1000 uf, 35 V, ALUM. ELECT. | | 3 |
| C4, C5, C8, C9, C14 | CAPACITOR, 10 uf, 25 V, SOLID TANTALUM | | 5 |
| C6, C10, C11, C15 | CAPACITOR, .1 uf, 25–50 V, CERAMIC | | 4 |

TABLE A-continued

| PBC NO. | DESCRIPTION | PART NO. | QT. |
|---|---|---|---|
| C7 | CAPACITOR, 1 uf, 25 V, SOLID TANTALUM | | 1 |
| C12 | CAPACITOR, 50 uf, 16 V, SOLID TANTALUM | | 1 |
| C13 | CAPACITOR, 100 uf, 250 V, ALUM. ELECT. | | 1 |

NOTE:
1% RESISTORS ARE METAL FILM
5% RESISTORS ARE CARBON FILM

TABLE B

| PCB NO. | DESCRIPTION | PART NO. | QT. |
|---|---|---|---|
| CR1, CR2, CR3, CR4 | RECTIFIER DIODE | 1N4004 | 4 |
| CR5, CR6, CR7, CR8, CR9 | SIGNAL DIODE | 1N4148 | 5 |
| CR10, CR11, CR12, CR13, CR15 | SIGNAL DIODE | 1N4148 | 5 |
| CR16, CR17, CR18, CR19, CR20 | SIGNAL DIODE | 1N4148 | 5 |
| CR14 | RECTIFIER DIODE | 1N4007 | 1 |
| CR21 | ZENER DIODE, 5.1 V, 1 W | 1N4733A | 1 |
| CR22 | ZENER DIODE, 6.2 V, 250 mW | 1N823A | 1 |
| F1 | FUSE, ½ A, PCB MOUNT | | 1 |
| K1, K2 | RELAY, 12 VDC COIL, 120 V 3A CONTACTS | G2R-114P-US-VD | 2 |
| RN1 | RESISTOR NETWORK, 9 × 1K, SIP | EXB-F10E102G | 1 |
| T1 | TRANSFORMER, 120/240 V 28 V CT @ 10 VA | 14A-10-28 | 1 |
| Q1 | NPN TRANSISTOR | 2N3904 OR 2N4124 | 1 |
| S1 | THERMAL CUTOUT, 60° C., NORMALLY CLOSED | | 1 |
| U1 | +12 VDC REGULATOR | MC7812TC | 1 |
| U2 | −12 VDC REGULATOR | 79712 | 1 |
| U3 | DUAL COMPARATOR | LM393N | 1 |
| U4, U5 | DUAL OP AMP | LM1458N | 2 |
| U6 | TTL INVERTER | 74LS04 | 1 |
| U7 | OPTICAL COUPLER, 200% CTR, 2500 V BRKDN | H11B2 | 1 |
| U8 | PERIPHERAL DRIVER | 75452B | 1 |
| U9, U10 | TTL NOR GATE | 74LS02 | 2 |

Although there is described above a specific arrangement of a power controller apparatus having a voltage-controller turn-off in accordance with the present invention for the purpose of illustrating the manner in which the invention can be used to advantage, it is to be appreciated that the invention is not limited thereto. Accordingly, any and all variations and modifications which may occur to those skilled in the art are to be considered to be within the scope and spirit of the invention as defined by the appended claims.

What is claimed is:

1. A power controller apparatus which comprises:
   a. a circuit breaker having an electrically-actuatable trip coil for enabling the circuit breaker to be tripped-off electrically;
   b. means for electrically connecting the circuit breaker to an operating voltage;
   c. at least one unswitched power outlet connected to the circuit breaker to receive operating voltage therefrom;
   d. operating voltage monitoring means for monitoring said operating voltage and for providing a voltage indication when the operating voltage moves outside of a preestablished operating voltage range; and
   e. logic control means for receiving said voltage indication and for tripping-off the circuit breaker in response thereto,
   said control means having associated therewith a capacitor and means for charging the capacitor only when the circuit breaker is tripped on and is receiving said operating voltage and relay means for connecting the charged capacitor to the circuit breaker trip coil for thereby causing the energizing thereof in response to said voltage indication.

2. The power controller apparatus as claimed in claim 1, wherein the circuit breaker includes manual tripping means for enabling the circuit breaker to be manually tripped-on and tripped-off.

3. The power controller apparatus as claimed in claim 2, wherein the circuit breaker is configured so that after being tripped-off by the energizing of the trip coil, the circuit breaker remains tripped-off until being manually tripped-on.

4. The power controller apparatus as claimed in claim 2, wherein the logic control means include delay means for enabling the circuit breaker to stay manually tripped-on while the operating voltage is being established in said operating voltage monitoring means.

5. The power controller apparatus as claimed in claim 1, including at least one switched power outlet connected for receiving operating voltage from the circuit breaker, and further including a switch for turning the switched power outlet on and off when the circuit breaker is tripped on.

6. The power controller apparatus as claimed in claim 1, including thermal protection means for providing a second voltage indication when the temperature in a monitored region exceeds a preestablished temperature, said logic control means being connected for receiving said second voltage indication and being operative for connecting said capacitor to said circuit breaker trip coil in response to receiving said second voltage indication.

7. The power controller apparatus as claimed in claim 6, including means enabling the connection of an external bus thereto, said logic control means being connected for receiving a third voltage indication from said external bus and being operative for connecting said capacitor to said circuit breaker trip coil in response to receiving said third voltage indication.

8. The power controller apparatus as claimed in claim 1, wherein the operating voltage monitoring means include means enabling the setting of an upper voltage limit and the separate setting of a lower voltage limit, said upper and lower voltage limits establishing the said operating voltage range.

9. The power controller apparatus as claimed in claim 3, wherein the logic control means include delay means for enabling the circuit breaker to stay manually tripped-on while the operating voltage is being established in said operating voltage monitoring means.

10. The power controller apparatus as claimed in claim 3, including at least one switched power outlet connected for receiving operating voltage from the circuit breaker, and further including a switch for turning the switched power outlet on and off when the circuit breaker is tripped on.

11. The power controller apparatus as claimed in claim 3, including thermal protection means for providing a second voltage indication when the temperature in a monitored region exceeds a preestablished temperature, said logic control means being connected for receiving said second voltage indication and being operative for connecting said capacitor to said circuit breaker trip coil in response to receiving said second voltage indication.

12. The power controller apparatus as claimed in claim 3, including means enabling the connection of an external bus thereto, said logic control means being connected for receiving a third voltage indication from said external bus and being operative for connecting said capacitor to said circuit breaker trip coil in response to receiving said third voltage indication.

13. The power controller apparatus as claimed in claim 3, wherein the operating voltage monitoring means include means enabling the setting of an upper voltage limit and the separate setting of a lower voltage limit, said upper and lower voltage limits establishing said operating voltage range.

14. A power controller apparatus which comprises:
 a. a circuit breaker having an electrically-actuatable trip coil for enabling the circuit breaker to be tripped-off electrically;
 b. means for electrically connecting the circuit breaker to an operating voltage;
 c. at least one unswitched power outlet connected to the circuit breaker to receive operating voltage therefrom;
 d. operating voltage monitoring means for monitoring said operating voltage and for providing a voltage indication when the operating voltage moves outside of a preestablished operating voltage range, the operating voltage monitoring means including means enabling the setting of an upper voltage limit and the separate setting of a lower voltage limit, said upper and lower voltage limits establishing said operating voltage range; and
 e. logic control means for receiving said voltage indication and for tripping-off the circuit breaker in response thereto,
 said control means having associated therewith a capacitor and means for charging the capacitor only when the circuit breaker is tripped on and is receiving said operating voltage and relay means for connecting the charged capacitor to the circuit breaker trip coil for thereby causing the energizing thereof in response to said voltage indication, the logic control means further including delay means for enabling the circuit breaker to stay tripped-on while the operating voltage is being established in said operating voltage monitoring means.

15. The power controller apparatus as claimed in claim 14 wherein the circuit breaker includes manual tripping means for enabling the circuit breaker to be manually tripped-on and tripped-off, the circuit breaker being configured so that after being tripped-off by the energizing of the trip coil, the circuit breaker remains tripped-off until being manually tripped-on.

16. The power controller apparatus as claimed in claim 14, including at least one switched power outlet connected for receiving operating voltage from the circuit breaker, and further including a switch for turning the switched power outlet on and off when the circuit breaker is tripped on.

17. The power controller apparatus as claimed in claim 14, including thermal protection means for providing a second voltage indication when the temperature in a monitored region exceeds a preestablished temperature, said logic control means being connected for receiving said second voltage indication and being operative for connecting said capacitor to said circuit breaker trip coil in response to receiving said second voltage indication.

18. The power controller apparatus as claimed in claim 17, including means enabling the connection of an external bus thereto, said logic control means being connected for receiving a third voltage indication from said external bus and being operative for connecting said capacitor to said circuit breaker trip coil in response to receiving said third voltage indication.

* * * * *